United States Patent
Jeon et al.

(10) Patent No.: US 8,672,485 B2
(45) Date of Patent: Mar. 18, 2014

(54) ILLUMINATING UNIT AND DISPLAY APPARATUS INCLUDING THE SAME

(75) Inventors: Kee-uk Jeon, Seoul (KR); Sung-tae Kim, Seoul (KR); Jeong-ho Nho, Suwon-si (KR); Won-yong Lee, Suown-si (KR); Kyoung-choul Jang, Suwon-si (KR); Seok-chan Hong, Yongin-si (KR); Jong-hoi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 13/152,447

(22) Filed: Jun. 3, 2011

(65) Prior Publication Data
US 2011/0304826 A1   Dec. 15, 2011

(30) Foreign Application Priority Data
Jun. 11, 2010   (KR) .................. 10-2010-0055373

(51) Int. Cl.
*G03B 21/14*   (2006.01)
*G03B 21/20*   (2006.01)
*G03B 21/00*   (2006.01)
*F21V 3/00*    (2006.01)
*F21V 5/00*    (2006.01)
*G02B 27/30*   (2006.01)
*G02B 27/10*   (2006.01)

(52) U.S. Cl.
USPC .......... 353/38; 353/102; 353/32; 362/311.12; 362/336; 359/641; 359/622

(58) Field of Classification Search
None
See application file for complete search history.

(56) References Cited

U.S. PATENT DOCUMENTS

| | | | |
|---|---|---|---|
| 2004/0046942 A1* | 3/2004 | Katsumata et al. | 353/53 |
| 2005/0128435 A1* | 6/2005 | Yamauchi et al. | 353/20 |
| 2005/0237488 A1* | 10/2005 | Yamasaki et al. | 353/20 |
| 2008/0186458 A1* | 8/2008 | Kobayashi et al. | 353/99 |

* cited by examiner

*Primary Examiner* — William C Dowling
*Assistant Examiner* — Ryan Howard
(74) *Attorney, Agent, or Firm* — Sughrue Mion, PLLC

(57) ABSTRACT

An illuminating unit and a display apparatus including the illuminating unit are provided. The illuminating unit generates and emits light to a display element of the display apparatus, and includes a light source; a uniformizing unit which uniformizes light from the light source and includes a plurality of uniformizing lenses arranged on an optical path; a condensing unit which condenses light from the uniformizing unit to emit the light to the display element and includes a plurality of condensing lenses sequentially arranged on the optical path, and the uniformizing unit and the condensing unit are arranged based on a width of one of a plurality of cell lenses forming the uniformizing lens and a width of an image displayed in the display element.

18 Claims, 7 Drawing Sheets

ILLUMINATING UNIT AND DISPLAY APPARATUS INCLUDING THE SAME

CROSS-REFERENCE TO RELATED APPLICATION

This application claims priority from Korean Patent Application No. 10-2010-0055373, filed on Jun. 11, 2010 in the Korean Intellectual Property Office, the disclosure of which is incorporated herein by reference in its entirety.

BACKGROUND

1. Field

Apparatuses and methods consistent with the exemplary embodiments relate to a projection-type illuminating unit and a display apparatus including the same, and more particularly, to an illuminating unit including a configuration for improving the efficiency of light transmitted to a display element and a display apparatus including the same.

2. Description of the Related Art

A display apparatus includes a display panel such as a liquid crystal display (LCD) or a plasma display panel (PDP) to process and display an image thereon. An example of a display apparatus which includes a large screen and realizes high quality image is a projection-type display apparatus, which projects an image displayed on a display panel to a large screen by various lens configurations.

The projection-type display apparatus transmits light from a light source, such as a lamp, to a display panel to thereby form an image on the display panel. However, as the lamp has a short life span and generates much heat, a light emitting diode (LED) has been increasingly used as the light source instead. The LED has a longer life span and generates less heat while providing excellent color realization and displaying a clearer image.

To display an image on the display panel, however, a light emission area should be larger than an effective area of the panel which displays an image. If the light emission area of the panel is smaller than the effective area, light is not sufficiently supplied to an edge of the image and thus the edge becomes dark or is not displayed. If the light emission area of the panel is much larger than the effective area, the light amount supplied to an area outside of the effective area, i.e., not used for displaying the image, increases. This leads to a decrease in light efficiency due to increased light loss.

The light emission area of the display panel relies on various lens configurations provided between the light source and the display panel. Thus, an arrangement of the lens configurations in consideration of the display status of the image and light efficiency is an important parameter for a design of a display apparatus.

SUMMARY

According to an aspect of an exemplary embodiment, there is provided an illuminating unit which generates and emits light to a display element of a display apparatus, the illuminating unit including: a light source; a uniformizing unit which uniformizes light from the light source and includes a plurality of uniformizing lenses arranged on an optical path; a condensing unit which condenses light from the uniformizing unit to emit the light to the display element and includes a plurality of condensing lenses sequentially arranged on the optical path, and the uniformizing unit and the condensing unit are arranged to meet the following formula:

$$1.0 < (D2/H2)/(D1/H1) \leq 1.4 \qquad \text{<Formula 1>}$$

in which H1 is a width of a cell lens of the uniformizing lenses, H2 is a width of an image displayed in the display element, D1 is a distance between a light incident surface initially arranged on the optical path and a light emission surface lastly arranged on the optical path among the plurality of uniformizing lenses, and D2 is a distance between the light emission surface lastly arranged on the optical path among the plurality of uniformizing lenses and a light incident surface lastly arranged on the optical path among the plurality of condensing lenses.

H1 may be designated as a horizontal width or a vertical width of the cell lens, and H2 may be designated as a horizontal width of the image if H1 is designated as a horizontal width of the cell lens, and H2 may be designated as a vertical width of the image if H1 is designated as a vertical width of the cell lens.

The uniformizing lens may include a fly eye lens in which the cell lenses are arrayed according to a same standard.

The illuminating unit may further include a collimating light unit which adjusts diffused light from the light source to collimating light and emits the collimating light to the uniformizing unit and the collimating light unit includes a plurality of collimating light lenses sequentially arranged on the optical path.

The plurality of collimating light lenses may include a first collimating light lens provided in the light source and a second collimating light lens provided in the uniformizing unit, and meets the following formula:

$$0.5 < p1/p2 \leq 1.2 \qquad \text{<Formula 2>}$$

in which p1 is a power of the first collimating light lens and p2 is a power of the second collimating light lens.

The plurality of condensing lenses may include a first condensing lens provided in the collimating light unit and a second condensing lens provided in the display element and meets the following formula:

$$0.9 \leq p3/p4 \leq 1.1 \qquad \text{<Formula 3>}$$

in which p3 is a power of the first condensing lens and p4 is a power of the second condensing lens.

The illuminating unit may further include a reflection mirror which is installed on the optical path between the first condensing lens and the second condensing lens.

The illuminating unit may further include a polarization converting unit which converts light emitted from the uniformizing unit to a preset polarizing property and emits the converted light to the condensing unit.

The light source may include a light emitting diode (LED).

According to an aspect of another exemplary embodiment, there is provided a display apparatus including: an illuminating unit which generates and emits light, the illuminating unit including a light source; a display element which displays an image by the light emitted by the illuminating unit; a projection optical unit which projects an image displayed on the display element to a screen, a uniformizing unit which uniformizes light emitted from the light source and includes a plurality of uniformizing lenses sequentially arranged on an optical path; and a condensing unit which condenses light emitted from the uniformizing unit to emit the condensed light to the display element and includes a plurality of condensing lenses sequentially arranged on the optical path, and the uniformizing unit and the condensing unit are arranged to meet the following formula:

$$1.0 < (D2/H2)/(D1/H1) \leq 1.4 \qquad \text{<Formula 1>}$$

in which H1 is a width of a cell lens of the uniformizing lenses, H2 is a width of an image displayed in the display element, D1 is a distance between a light incident surface initially arranged on an optical path among the plurality of uniformizing lenses and a light emission surface lastly arranged among the plurality of uniformizing lenses, and D2 is a distance between the light emission surface lastly arranged among the plurality of uniformizing lenses and a light incident surface lastly arranged on the optical path among the plurality of condensing lenses.

According to an aspect of another exemplary embodiment, there is provided an illuminating unit which generates and emits light to a display element of a display apparatus, the illuminating unit including: a light source; a collimating light unit which adjusts diffused light emitted from the light source to collimating light and includes a first collimating light lens and a second collimating light lens sequentially arranged along an optical path; a uniformizing unit which uniformizes light emitted from the second collimating light lens and includes a first uniformizing lens and a second uniformizing lens sequentially arranged along the optical path; a polarization converting unit which converts light emitted from the second uniformizing lens to a preset polarizing property; a condensing unit which condenses light emitted from the polarization converting unit to emit the light to the display element and includes a first condensing lens and a second condensing lens sequentially arranged along the optical path; and a distance between the first uniformizing lens, the second uniformizing lens, and the second condensing lens are designated based on a width of one of a plurality of cell lenses forming the first uniformizing lens and a width of an image displayed in the display element.

The first uniformizing lens, the second uniformizing lens and the second condensing lens may be arranged to meet the following formula:

$$1.0 < (D2/H2)/(D1/H1) \leq 1.4 \quad \text{<Formula 4>}$$

in which H1 is a width of the cell lens, H2 is a width of an image displayed in the display element, D1 is a distance between a light incident surface of the first uniformizing lens and a light emission surface of the second uniformizing lens and D2 is a distance between the light emission surface of the second uniformizing lens and a light incident surface of the second condensing lens.

H1 may be designated as a horizontal width or a vertical width of the cell lens, and H2 may be designated as a horizontal width of the image if H1 is a horizontal width of the cell lens, and designated as a vertical width of the image if H1 is a vertical width of the cell lens.

The first uniformizing lens and the second uniformizing lens may include a fly eye lens in which the cell lenses are arrayed according to a same standard.

The first uniformizing lens and the second uniformizing lens may have cell lenses whose convex surfaces are arranged back to back.

The first collimating light lens and the second collimating light lens may include collimating lenses.

The illuminating unit may further include a reflection mirror which is provided on the optical path between the first condensing lens and the second condensing lens.

The light source may include a light emitting diode (LED) element.

According to an aspect of an exemplary embodiment, there is provided a display apparatus including: an illuminating unit which generates and emits light; a display element which forms an image by the light emitted by the illuminating unit; a projection optical unit which projects an image formed in the display element to a screen, and the illuminating unit including: a light source; a collimating light unit which adjusts diffused light emitted from the light source to collimating light and includes a first collimating light lens and a second collimating light lens sequentially arranged along an optical path; a uniformizing unit which uniformizes light emitted from the second collimating light lens and includes a first uniformizing lens and a second uniformizing lens sequentially arranged along the optical path; a polarization converting unit which converts light emitted from the second uniformizing lens to a preset polarizing property; a condensing unit which condenses light emitted from the polarization converting unit to emit the light to the display element and includes a first condensing lens and a second condensing lens sequentially arranged along the optical path; and a distance between the first uniformizing lens, the second uniformizing lens and the second condensing lens are designated based on a width of one of the plurality of cell lenses forming the first uniformizing lens and a width of an image displayed in the display element.

The illuminating unit and the display element may be installed corresponding to a plurality of colors, and the display apparatus may further include an image synthesizing unit which synthesizes an image displayed in the display element corresponding to each the plurality of colors and transmits the image to the projection optical unit.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
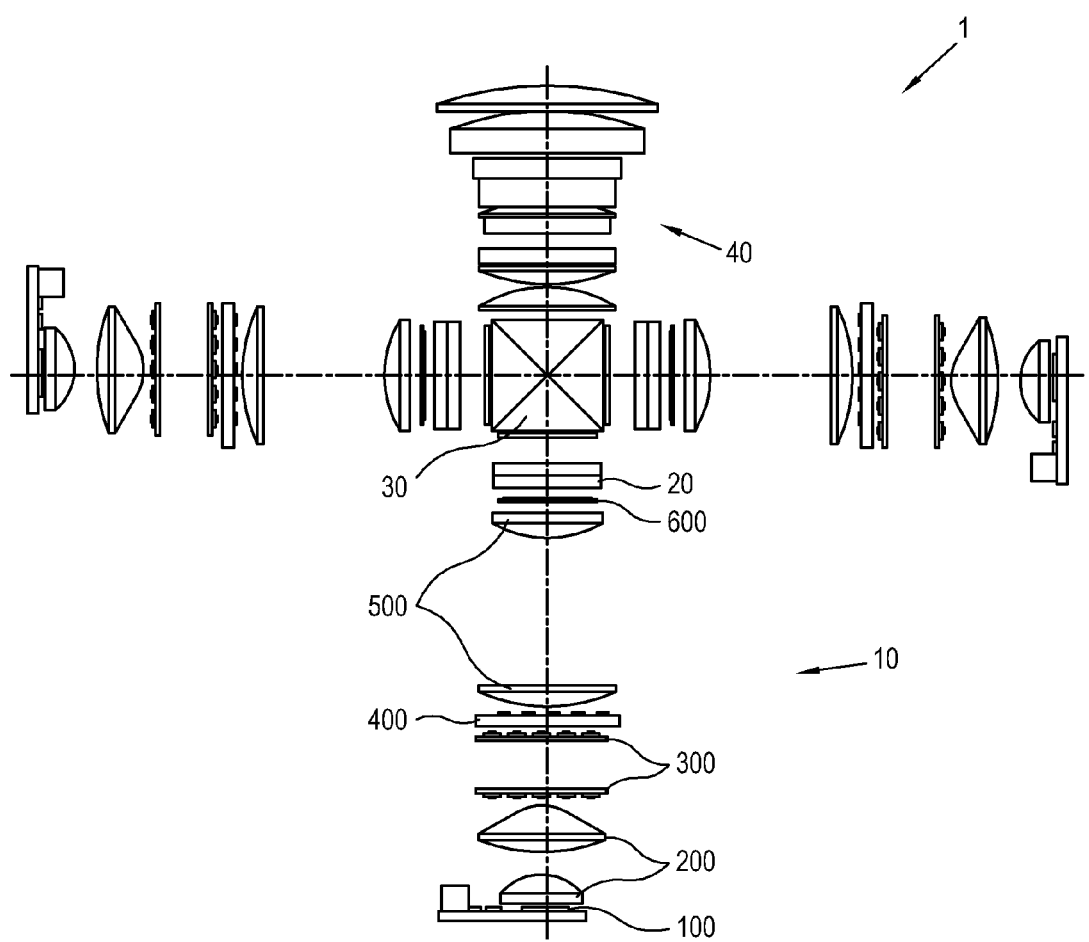
FIG. 1 illustrates a configuration of a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates an optical arrangement of a display apparatus 1 according to an exemplary embodiment.

As shown therein, the display apparatus 1 according to an exemplary embodiment is a projection type display apparatus. The display apparatus 1 includes an illuminating unit 10 to generate and emit a predetermined color of light, a display element 20 to display an image on a plate surface based on light emitted by the illuminating unit 10, and a projection optical unit 40 to enlarge and project an image displayed on the display element 20 to a screen (not shown).

The display apparatus 1 includes the illuminating unit 10 and the display element 20 corresponding to colors, e.g., RGB colors. The display apparatus 1 further includes an image synthesizing unit 30 which is provided as an X-prism or a color cube and synthesizes an image formed in the display element 20 by color and transmits the image to the projection optical unit 40. According to an exemplary embodiment, the illuminating unit 10 and the display element 20 corresponding to one color are described, and those corresponding to other colors are not described.

The illuminating unit 10 includes a light source 100 to generate and emit light, a collimating light unit 200 to adjust diffused light emitted by the light source 100 to collimated light, a uniformizing unit 300 to uniformize light emitted from the collimating light unit 100, a polarization converting unit 400 to convert light from the uniformizing unit 300 into preset polarizing light, and a condensing unit 500 to condense light from the polarization converting unit 400 to be emitted to the display element 20.

The illuminating unit 10 may further include a polarizing plate 600 which is provided between the condensing unit 500 and the display element 20 and filters the polarizing property of light.

Elements of the illuminating unit 10, which adjust the property of light, include lenses which are provided along an optical path to adjust an aberration.

The display element 20 forms an image by selectively allowing light from the illuminating unit 10 to penetrate through the display element 20 or by reflecting such light. The display element 20 includes a preset effective area in a plate surface thereof, and an image is displayed on the effective area as light is emitted to the effective area.

The display element 20 may include a reflective display element which selectively reflects incident light by pixel to form an image, and a penetrative liquid crystal display (LCD) element which selectively allows incident light to penetrate by pixel to thereby form an image. The reflective display element includes a digital micro-mirror device (DMD), a liquid crystal on silicon (LCOS) or the like.

Figure 2:
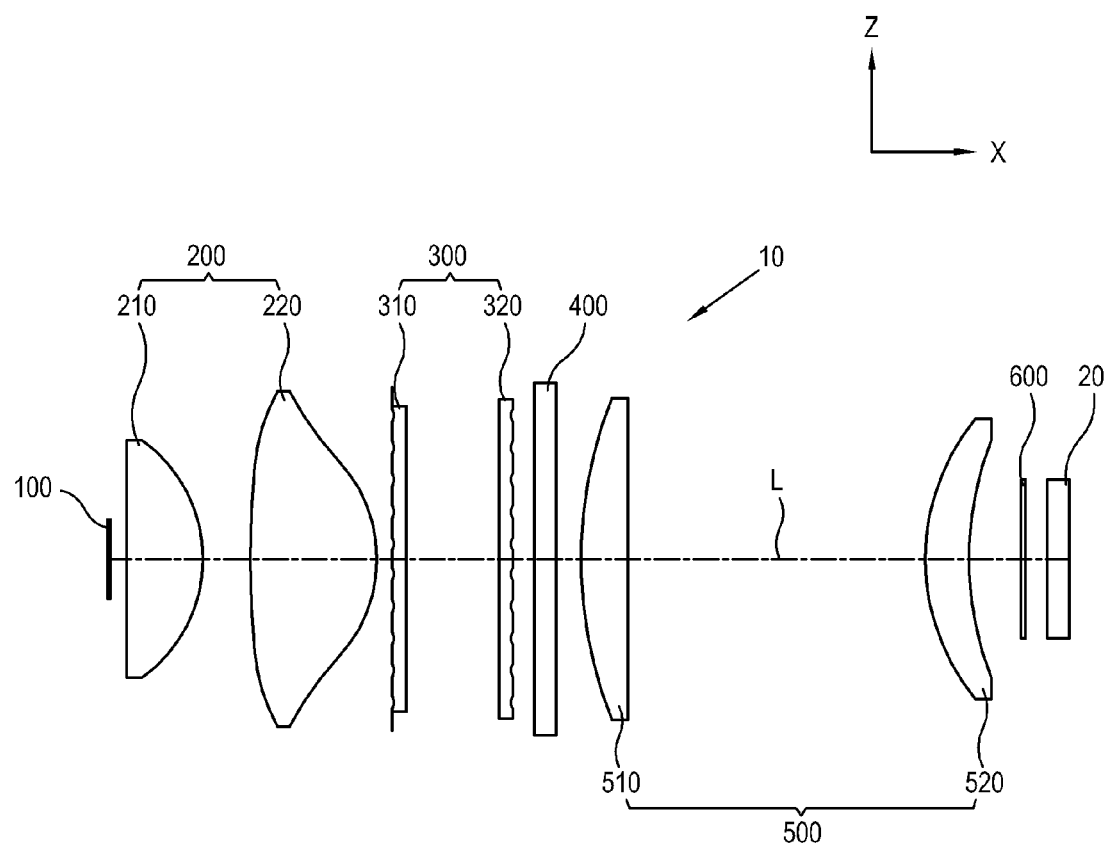
FIG. 2 illustrates an arrangement of an illuminating unit and a display element of the display apparatus in FIG. 1.

Hereinafter, the configuration of the illuminating unit 10 according to an exemplary embodiment will be described with reference to FIG. 2. FIG. 2 illustrates elements of the illuminating unit 10 which are arranged along an optical path L from the light source 100 to the display element 20.

The directions shown in FIG. 2 will now be described. Directions X, Y and Z are perpendicular to one another. The optical path L from the light source 100 is formed along the direction X, and the display element 20 is provided in a plane Y-Z. The collimating light unit 200, the uniformizing unit 300, the polarization converting unit 400 and the condensing unit 500 are sequentially arranged along the optical path L between the light source 100 and the display element 20. In the drawings and the exemplary embodiment, a description will be provided on the basis of the foregoing definition of the directions. Directions which are the opposite of the directions X, Y and Z are directions −X, −Y and −Z. The plane Y-Z means a plane formed on an axis in the direction Y and an axis in the direction Z.

As shown therein, the light source 100 includes an LED element, which can be of various shapes and sizes, and generates and emits light in the direction X. The light emitted by the light source 100 has the property of diffused light.

The collimating light unit 200 adjusts diffused light emitted by the light source 100 to collimated light. The collimating light unit 200 includes a first collimating light lens 210 and a second collimating light lens 220 which are sequentially arranged along the optical path L and are provided as collimating lenses.

The uniformizing unit 300 uniformly adjusts a light amount distribution of collimating light if collimating light adjusted by the collimating light unit 200 is incident on the uniformizing unit 300. The uniformizing unit 300 includes a first uniformizing lens 310 and a second uniformizing lens 320 which are sequentially arranged along the optical path L and are provided as fly-eye lenses. The first and second uniformizing lenses 310 and 320 are formed by a plurality of arrayed cell lenses or segment lenses arrayed, respectively. The cell lenses include a light incident surface and a light emitting surface, one of which is flat and the other is convex.

The first and second uniformizing lenses 310 and 320 have the same standard, and a ratio of a horizontal width and a vertical width of the cell lenses of the first and second uniformizing lenses 310 and 320 are substantially the same as those of the effective area of the display element 20 displaying an image thereon. Accordingly, when the uniformized light is emitted by the uniformizing unit 300 to the effective area of the display element 20, the ratio of the horizontal width and the vertical width of the light emitting area corresponds to the effective area. That the first uniformizing lens 310 has the same standard as the second uniformizing lens 320 means that the structure and the optical adjusting function thereof show substantially the same characteristics.

The first uniformizing lens 310 and the second uniformizing lens 320 may be arranged so that the convex surfaces of the cell lenses are back to back and the flat surfaces face each other. However, this arrangement may be changed in consideration of light properties when the display apparatus 1 and the illuminating unit 10 are designed.

The polarization converting unit 400 converts a polarization property of light which has become uniform by the uniformizing unit 300. The polarization converting unit 400 has a plurality of polarizing prisms (not shown) which extends in a certain direction and in parallel with the plane Y-Z. Then, the polarization converting unit 400 assigns a polarization property of one of a p-polarization and an s-polarization to light emitted by the uniformizing unit 300 and emits such light.

The light converted by the polarization converting unit 400 penetrates the polarizing plate 600 and the polarizing property of light emitted by the display element 20 is finally adjusted.

The condensing unit 500 condenses and emits light whose polarizing property is adjusted by the polarization converting unit 400, to the display element 20. The condensing unit 500 includes a first condensing lens 510 and a second condensing lens 520 which are sequentially arranged along the optical path L and provided as condensing lenses or relay lenses.

Figure 3:
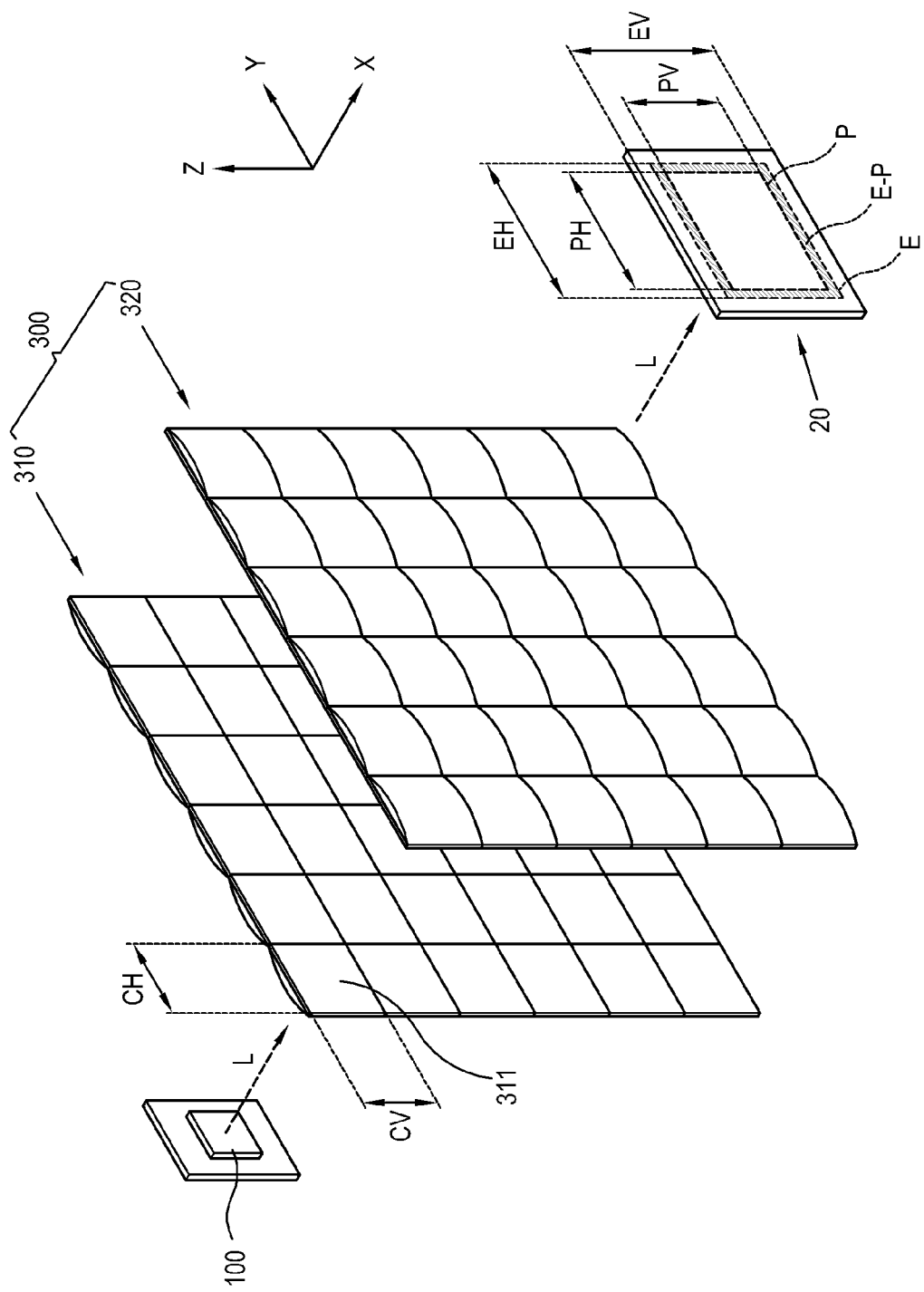
FIG. 3 is a perspective view of a light source, a uniformizing unit and the display element of the display apparatus in FIG. 2.

FIG. 3 is a perspective view of the light source 100, the uniformizing unit 300 and the display element 20.

As shown therein, the first uniformizing lens 310 includes a plurality of cell lenses 311 which are arrayed along the plane Y-Z and has a predetermined horizontal width CH and a vertical width CV. Light is emitted from the light source 100 to the cell lenses 311 along the optical path L, and light emitted by the cell lenses 311 overlaps the effective area P of the display element 20.

The effective area P is an area in which an image is displayed and has a predetermined horizontal width PH and vertical width PV.

To normally display an image in the display element 20, a light emission area E of light emitted from the light source 100 to the display element 20 should include the effective area P. That is, a horizontal width EH and vertical width EV of the light emission area E should be wider than a horizontal width PH and a vertical width PV of the effective area P, but the effective area P should be within the light emission area E.

An area E-P of the light emission area E outside the effective area P is not the effective area P, and thus the light emitted to the area E-P is not used to display an image but is lost. Accordingly, the light emission area E should be larger than the effective area P. However, if the area E-P is significantly large, light loss increases, which is not desired.

Accordingly, the horizontal width EH and the vertical width EV of the light emission area E should be properly designated in consideration of the normal display of the image and light efficiency. According to an exemplary embodiment, if the widths CH and CV of the cell lenses 311 of the first uniformizing lens 310 and the widths PH and PV of the effective area P of the display element 20 are determined, the arrangement of the elements within the illuminating unit 10 may be adjusted to thereby form an appropriate light emission area E.

Then, only the adjustment of the arrangement of the illuminating unit 10 may improve light emission efficiency with respect to the display element 20 without any additional installation.

Figure 4:
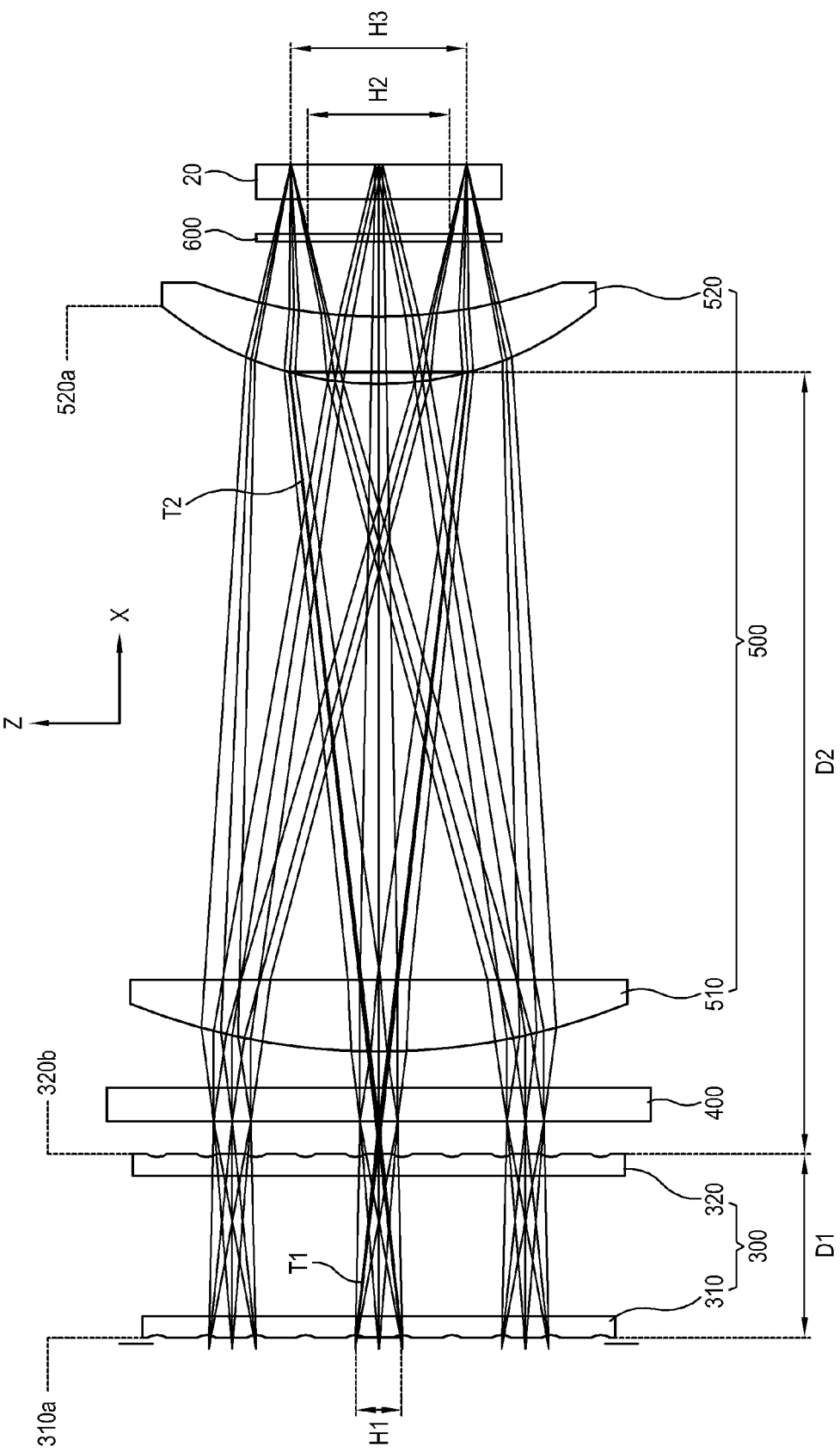
FIG. 4 illustrates an arrangement method for the illuminating unit depending on a uniformizing lens and the display element of the display apparatus in FIG. 2.

Hereinafter, the adjustment of the arrangement of the illuminating unit 10 according to an exemplary embodiment will be described with reference to FIG. 4. FIG. 4 illustrates the uniformizing unit 300, the polarization converting unit 400, the condensing unit 500 and the display element 20 which are arranged along the optical path L.

As shown therein, light is emitted from the light source 100 to the cell lenses 311 of the first uniformizing lens 310 through the collimating light unit 200. The light emitted to the cell lenses 311 of the first uniformizing lens 310 penetrates the second uniformizing lens 320 and is converted to a preset polarizing property by the polarization converting unit 400. The converted light is condensed by the first and second condensing lenses 510 and 520 and emitted to the display element 20.

A width of the cell lens 311 of the first uniformizing lens 310 is called H1 and a width of an image or a width of the effective area P of the display element 20 which is parallel to H1 is called H2. H1 may be designated as one of the horizontal width and vertical width of the cell lens 311. If H1 is the horizontal width of the cell lens 311, H2 is designated as the horizontal width of the effective area P. If H1 is the vertical width of the cell lens 311, H2 is designated as the vertical width of the effective area P.

For example, in the cell lens 311 with the width H1 located in the center of the first uniformizing lens 310, two chief rays which are emitted in parallel to opposite ends of the width of the cell lens 311 is considered. The two chief rays are refracted through the first uniformizing lens 310, and form an intersection on a light emission surface 320b of the second uniformizing lens 320. Then, an isosceles triangle T1 is formed by the two chief rays and the light incident surface 310a of the first uniformizing lens 310. A base line of the isosceles triangle T1 becomes H1 as the width of the cell lens 311, and a height of the isosceles triangle T1 becomes D1 as a distance between the light incident surface 310a of the first uniformizing lens 310 and the light emission surface 320b of the second uniformizing lens 320.

The two chief arrays intersect on the light emission surface 320b of the second uniformizing lens 320 and become collimated light by a light incident surface 520a of the second condensing lens 520 and emitted to the display element 20. That is, the width of the two chief arrays has substantially the same width H3 in the light incident surface 520a of the second condensing lens 520 and the display element 20.

Then, an isosceles triangle T2 is formed by the two chief arrays and the light incident surface 520a of the second condensing lens 520. A base line of the isosceles triangle T2 becomes H3, and a height of the isosceles triangle T2 becomes D2 as a distance between the light emission surface 320b of the second uniformizing lens 320 and the light incident surface 520a of the second condensing lens 520.

To normally display the image in the display element 20, the width H3 should exceed the width H2, which meets the following formula:

$$1.0 < (H3/H2) \leq k \qquad \text{<Formula 1>}$$

In Formula 1 above, k is a constant exceeding 1, and may vary in consideration of light efficiency. The constant k will be described later.

However, the isosceles triangles T1 and T2 formed by the two chief rays are similar to each other and meet the following formula:

$$H1:D1 = H3:D2$$

$$H3 = H1*(D2/D1) \qquad \text{<Formula 2>}$$

Formula 2 meets the following formula if substituted for Formula 1:

$$1.0 < (H1/H2)*(D2/D1) \leq k$$

$$1.0 < (D2/H2)/(D1/H1) \leq k \qquad \text{<Formula 3>}$$

In Formula 3 above, H1 refers to a width of the cell lens 311 of the first uniformizing lens 310. H2 refers to a width of an image or a width of the effective area P to display an image in the display element 20. D1 refers to a distance between the light incident surface 310a of the first uniformizing lens 310 and the light emission surface 320b of the second uniformizing lens 320. D2 refers to a distance between the light emission surface 320b of the second uniformizing lens 320 and the light incident surface 520a of the second condensing lens 520.

That is, according to an exemplary embodiment, if the width of the cell lens 311 of the first uniformizing lens 310 and the width of the effective area P of the display element 20 are designated, the distance between the first uniformizing lens 310, the second uniformizing lens 320 and the second condensing lens 520 may be determined.

In addition, power between the lenses is adjusted to effectively form the illuminating unit 10 according to an exemplary embodiment.

The power of the lenses is an inherent property of the lenses, and reciprocal to an effective focal length of the lenses. If the effective focal length of the lenses is relatively short, power is great. If the effective focal length of the lenses is relatively long, power is small.

For example, if the collimating light unit 200 includes the first collimating light lens 210 arranged in the light source 100 and the second collimating light lens 220 arranged in the first uniformizing lens 310, a power p1 of the first collimating light lens 210 and a power p2 of the second collimating light lens 220 meet the following formula:

$$0.5 \leq p1/p2 \leq 1.2 \qquad \text{<Formula 4>}$$

If the condensing unit 500 includes the first condensing lens 510 arranged in the second collimating light lens 220 or the polarization converting unit 400, and the second condensing lens 520 is arranged in the display element 20, a power p3 of the first condensing lens 510 and a power p4 of the second condensing lens 520 meet the following formula:

$$0.9 \leq p3/p4 \leq 1.1 \quad \text{<Formula 5>}$$

If the collimating light unit 200 and the condensing unit 500 meet Formula 4 and Formula 5, respectively, adjustment of light to collimating light or condensation of light may be performed normally. If the collimating light unit 200 and the condensing unit 500 do not meet Formula 4 and Formula 5, respectively, the light is hardly emitted from the light source 100 to the display element 20 in the preset range and with the preset light amount. Also, the above exemplary embodiment would not apply.

Hereinafter, a test case in which parameters are adjusted when W=(D2/H2)/(D1/H1) will be described with respect to an exemplary embodiment.

The data of the collimating light unit 200 applicable to the tests are as follows:

TABLE 1

| Element | r (mm) | d (mm) | n | vd |
|---|---|---|---|---|
| Light emission surface of light source | ∞ | 1.700 | 1.52310 | 55.00 |
| Light incident surface of first collimating light lens | ∞ | 8.000 | 1.74330 | 49.22 |
| Light emission surface of first collimating light lens | −15.311 | 4.896 | | |
| Light incident surface of second collimating light lens | 83.737 | 13.000 | 1.52917 | 55.00 |
| Light emission surface of second collimating light lens | −15.961 | 1.567 | | |

In Table 1 above, "r" refers to a curvature of the light incident surface or the light emission surface. The value ∞ means a formation of a straight line perpendicular to the optical path L. If "r" is a minus value, the light incident surface or the light emission surface is convex in the movement direction of light. If "r" is a plus value, the light incident surface or the light emission surface is convex in an opposite direction of the movement direction of light.

The element "d" means a gap or distance between the configuration corresponding to the line of the value and the configuration corresponding to the next line in Table 1. For example, in Table 1, the distance between the light incident surface and the light emission surface of the first collimating light lens 210 is 8.000 mm. The distance between the light emission surface of the first collimating light lens 210 and the light incident surface of the second collimating light lens 220 is 4.896mm.

The element "n" refers to a refractive index, and "vd" refers to an Abbe number which is an inherent property of the lens.

With the configuration of the light source 100 and the collimating light unit 200 as above, the configuration of the illuminating unit 10 and the display element 20 is adjusted as follows to conduct tests. In each case, the loss rate of light emitted to the display element 20 was measured.

(1) First Case

The configuration data of the first uniformizing lens 310, the second uniformizing lens 320, the polarization converting unit 400, the first condensing lens 510, the second condensing lens 520, the polarizing plate 600 and the display element 20 applicable to the first case is as follows:

TABLE 2

| Element | r (mm) | d (mm) | n | vd |
|---|---|---|---|---|
| Light incident surface of first uniformizing lens | 6.200 | 1.600 | 1.48990 | 55.67 |
| Light emission surface of first uniformizing lens | ∞ | 9.600 | | |
| Light incident surface of second uniformizing lens | ∞ | 1.600 | 1.48990 | 55.67 |
| Light emission surface of second uniformizing lens | −6.200 | 2.080 | | |
| Light incident surface of polarization converting unit | ∞ | 2.200 | 1.523014 | 58.59 |
| Light emission surface of polarization converting unit | ∞ | 2.505 | | |
| Light incident surface of first condensing lens | 44.518 | 5.000 | 1.713000 | 53.94 |
| Light emission surface of first condensing lens | ∞ | 40.292 | | |
| Light incident surface of second uniformizing lens | 22.720 | 4.710 | 1.834001 | 37.35 |
| Light emission surface of second condensing lens | 37.504 | 5.200 | | |
| Light incident surface of polarizing plate | ∞ | 0.700 | 1.516330 | 64.14 |
| Light emission surface of polarizing plate | ∞ | 2.220 | | |
| Light incident surface of display element | ∞ | — | 1.458440 | 67.82 |

The meaning of data in Table 2 is similar to that in Table 1.

In the first case, the cell lens 311 of the first uniformizing lens 310 and the effective area P of the display element 20 have the following configuration. A conic constant of the cell lens 311 is −2.000.

TABLE 3

| Element | Horizontal width (mm) | Vertical width (mm) |
|---|---|---|
| Cell lens | 4.400 | 3.300 |
| Effective area of display element | 15.872 | 11.904 |

In Table 3 above, any of the horizontal width and vertical width of the cell lens 311 may be selected. According to an exemplary embodiment, the data of the vertical width of the cell lens 311 and the vertical width of the effective area P are selected. In this case, in W=(D2/H2)/(D1/H1), $$H1=3.300$$

$$H2=11.904$$

In the data for the present test, the unit of H1, H2, D1 and D2 is in mm, and the unit will be omitted for purposes of convenience.

D1 refers to a distance between the light incident surface of the first uniformizing lens 310 and the light emission surface of the second uniformizing lens 320. D2 refers to a distance between the light emission surface of the second uniformizing lens 320 and the light incident surface of the second condensing lens 520. According to Table 2, $$D1=1.600+9.600+1.600=12.800$$

$$D2=2.080+2.200+2.505+5.000+40.292=52.077$$

Accordingly, W is calculated as follows:

$$W=(D2/H2)/(D1/H1)=(52.077/11.904)/(12.800/3.300)=1.128$$

Figure 5:
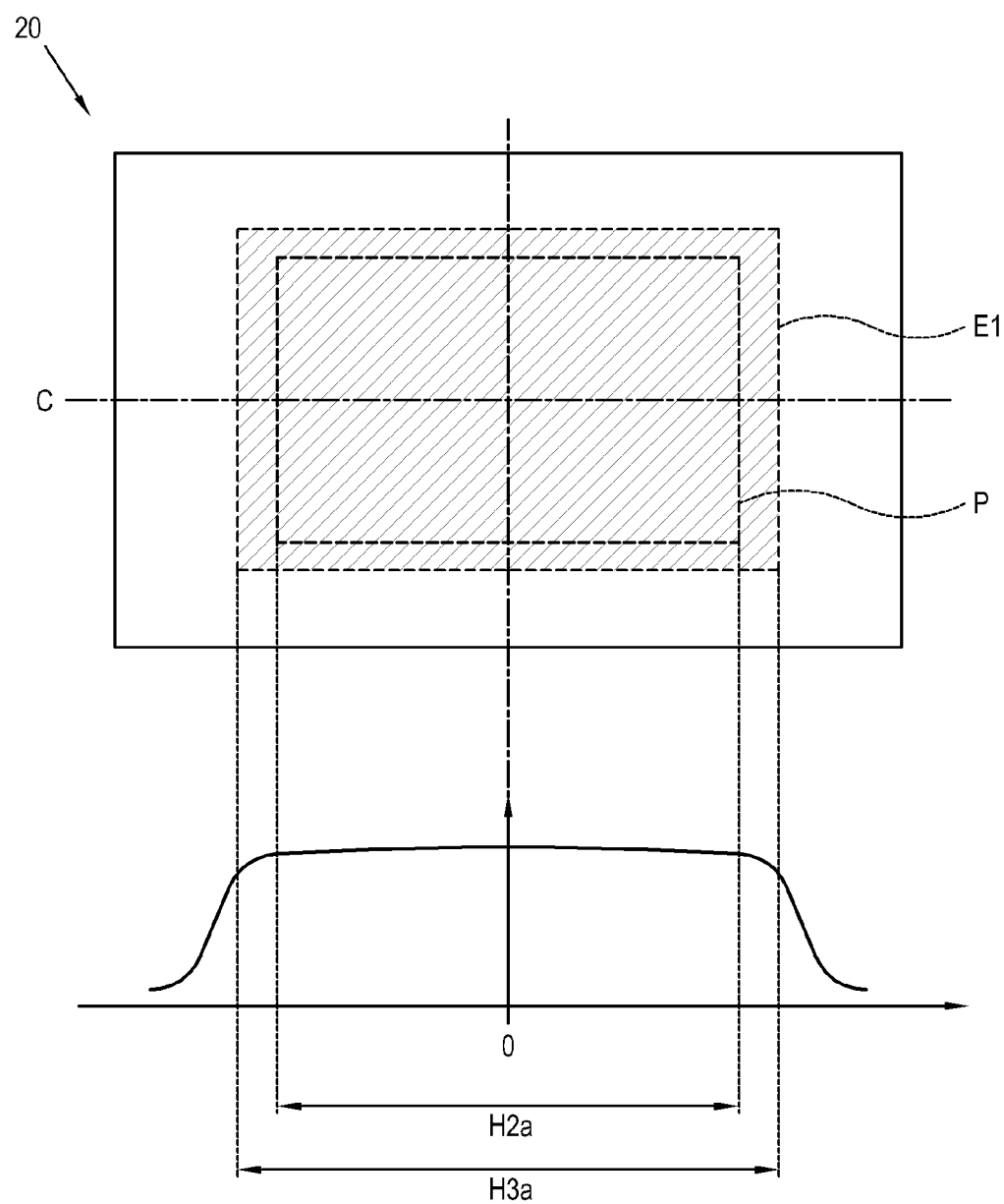
FIG. 5 illustrates a wider width of light emitted from the display element to the illuminating unit in FIG. 4 than that of an image.

FIG. 5 illustrates an example of the effective area P of the display element 20 and the light emission area E1 in the first case.

As shown therein, if a width of the effective area P displaying the image in the display element 20 is H2a and a width of the light emission area E1 formed by emitting light from the illuminating unit 10 to the display element 20 is H3a, W equals 1.128 and H2a<H3a. In the first case, a light loss rate which represents the light amount emitted to the area outside the effective area P of the display element 20 was measured at 13.03%.

A graph below the display element 20 refers to the light amount in each location of a straight line C formed along the central area of the display element 20. That is, the horizontal axis in the graph refers to each location of the display element 20 along the straight line C, and a vertical axis refers to the light amount. As shown in the graph, the light emission area E1 shows predetermined light or more, but the area outside the light emission area E1 shows a drastic decrease in the light amount. As the area which shows the drastic decrease in the light amount is outside of the width H3a, the display area is rarely affected.

As described above, in the first case where W=1.128, the image is normally displayed in the display element 20 and relatively smaller light loss occurs.

(2) Second Case

The configuration data of the first uniformizing lens 310, the second uniformizing lens 320, the polarization converting unit 400, the first condensing lens 510, the second condensing lens 520, the polarizing plate 600 and the display element 20 applicable to the second case is as follows:

TABLE 4

| Element | r (mm) | d (mm) | n | vd |
|---|---|---|---|---|
| Light incident surface of first uniformizing lens | 5.100 | 1.600 | 1.48990 | 55.67 |
| Light emission surface of first uniformizing lens | ∞ | 8.200 | | |
| Light incident surface of second uniformizing lens | ∞ | 1.600 | 1.48990 | 55.67 |
| Light emission surface of second uniformizing lens | −5.100 | 1.500 | | |
| Light incident surface of polarization converting unit | ∞ | 2.200 | 1.523014 | 58.59 |
| Light emission surface of polarization converting unit | ∞ | 1.120 | | |
| Light incident surface of first condensing lens | 28.500 | 4.000 | 1.713000 | 53.94 |
| Light emission surface of first condensing lens | 450.600 | 25.500 | | |
| Light incident surface of second condensing lens | 18.000 | 4.000 | 1.834001 | 37.35 |
| Light emission surface of second condensing lens | 33.300 | 4.600 | | |
| Light incident surface of polarizing plate | ∞ | 0.700 | 1.516330 | 64.14 |
| Light emission surface of polarizing plate | ∞ | 2.200 | | |
| Light incident surface of display element | ∞ | — | 1.458440 | 67.82 |

The meaning of data in Table 4 is similar to that in Table 1.

In the second case, the cell lens 311 of the first uniformizing lens 310 and the effective area P of the display element 20 have the following configuration. A conic constant of the cell lens 311 is −1.800.

TABLE 5

| Element | Horizontal width (mm) | Vertical width (mm) |
|---|---|---|
| cell lens | 4.400 | 2.470 |
| effective area of display element | 12.000 | 6.750 |

In Table 5, if data of the vertical width of the cell lens 311 and the vertical width of the effective area P are selected, H1=2.470, H2=6.750.

According to Table 4 above, $$D1=1.600+8.200+1.600=11.400$$

$$D2=1.500+2.200+1.120+4.000+25.500=34.320$$

Accordingly, W is calculated as follows:

$$W=(D2/H2)/(D1/H1)=(34.320/6.750)/(11.400/2.470)=1.102$$

Also in the second case, W>1.0 and the light emission area E1 and the effective area P of the display element 20 are similar to those in FIG. 5. However, in the second case, a gap between the width H2a and the width H3a is relatively small, and thus the light loss rate is relatively low.

(3) Third Case

The configuration data of the first uniformizing lens 310, the second uniformizing lens 320, the polarization converting unit 400, the first condensing lens 510, the second condensing lens 520, the polarizing plate 600 and the display element 20 applicable to the third case is as follows:

TABLE 6

| Element | r (mm) | d (mm) | n | vd |
|---|---|---|---|---|
| Light incident surface of first uniformizing lens | 6.200 | 1.600 | 1.48990 | 55.67 |
| Light emission surface of first uniformizing lens | ∞ | 9.600 | | |
| Light incident surface of second uniformizing lens | ∞ | 1.600 | 1.48990 | 55.67 |
| Light emission surface of second uniformizing lens | −6.200 | 2.080 | | |
| Light incident surface of polarization converting unit | ∞ | 2.200 | 1.523014 | 58.59 |
| Light emission surface of polarization converting unit | ∞ | 2.505 | | |
| Light incident surface of first condensing lens | 39.119 | 5.000 | 1.713000 | 53.94 |
| Light emission surface of first condensing lens | 333.812 | 33.569 | | |
| Light incident surface of second condensing lens | 22.392 | 4.710 | 1.834001 | 37.35 |
| Light emission surface of second condensing lens | 46.617 | 9.598 | | |
| Light incident surface of polarizing plate | ∞ | 0.700 | 1.516330 | 64.14 |
| Light emission surface of polarizing plate | ∞ | 2.200 | | |
| Light incident surface of display element | ∞ | — | 1.458440 | 67.82 |

The meaning of data in Table 6 is similar to that in Table 1.

In the third case, the cell lens 311 of the first uniformizing lens 310 and the effective area P of the display element 20 have the following configuration. A conic constant of the cell lens 311 is −2.000.

TABLE 7

| Element | Horizontal width (mm) | Vertical width (mm) |
|---|---|---|
| Cell lens | 4.400 | 3.300 |
| effective area of display element | 15.872 | 11.904 |

In Table 7, if the data of the vertical width of the cell lens 311 and the vertical width of the effective area P are selected, H1=3.300 and H2=11.904.

According to Table 6 above, $$D1=1.600+9.600+1.600=12.800$$

$$D2=2.080+2.200+2.505+5.000+33.569=45.354$$

Accordingly, W is calculated as follows:

$$W=(D2/H2)/(D1/H1)=(45.354/11.904)/(12.800/3.300)=0.982$$

Figure 6:
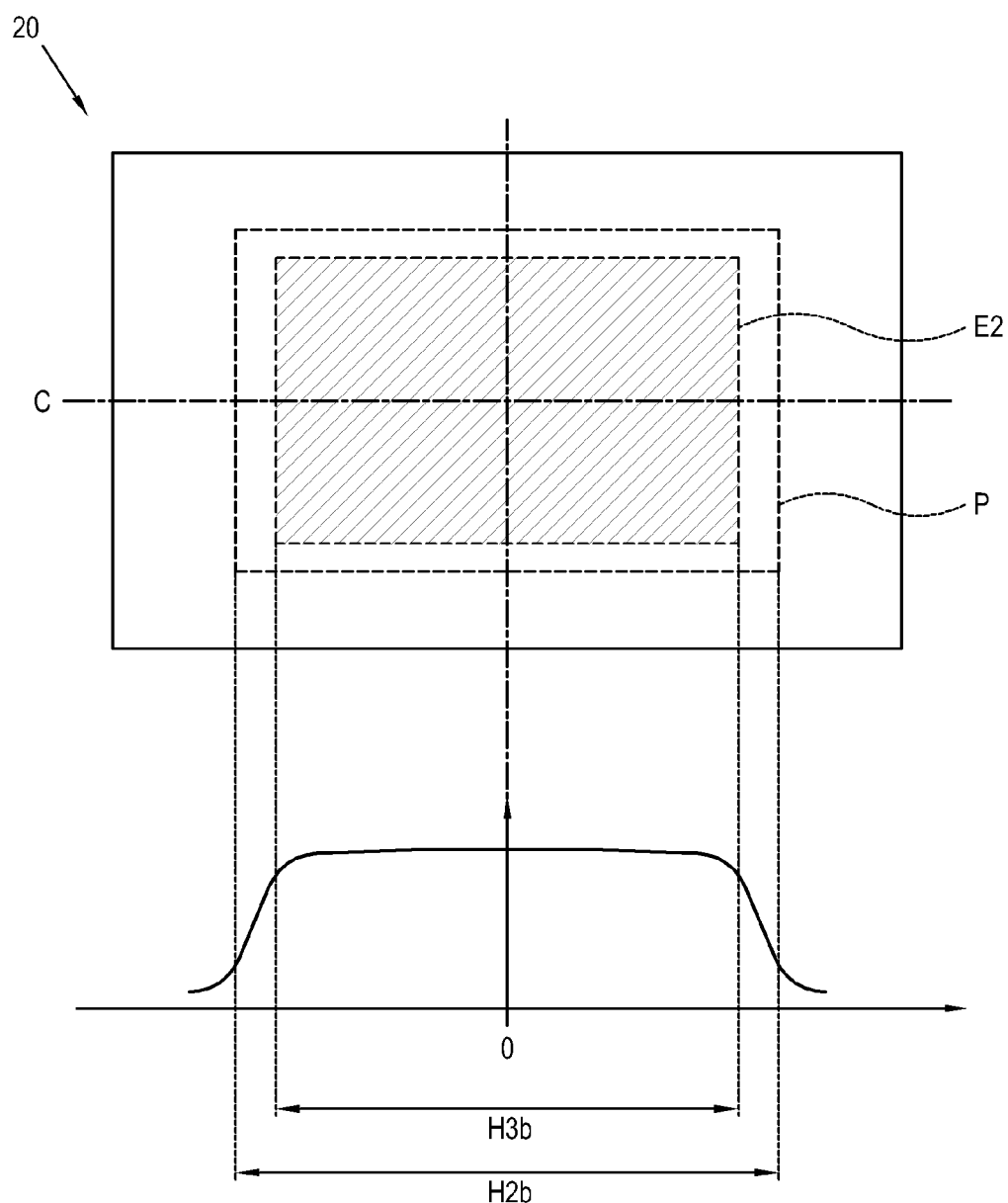
FIG. 6 illustrates a narrower width of light emitted from the display element to the illuminating unit in FIG. 4 than that of an image.

FIG. 6 illustrates an example of the effective area P and the light emission area E2 of the display element 20 in the third case.

As shown therein, if the width of the effective area P is H2b and the width of the light emission area E2 is H3b, W<1.0 and H2b>H3b. In this case, the light emission area E2 is smaller than the effective area P, and the area in which the light amount decreases drastically is located within the width H2b as shown in the graph. This is why the edge of the image is displayed relatively darker or rarely displayed.

The configuration of the third case, in which W<1.0, does not properly display the image.

(3) Fourth Case

The configuration data of the first uniformizing lens 310, the second uniformizing lens 320, the polarization converting unit 400, the first condensing lens 510, the second condensing lens 520, the polarizing plate 600 and the display element 20 applicable to the fourth case is as follows:

TABLE 8

| Element | r (mm) | d (mm) | n | vd |
|---|---|---|---|---|
| Light incident surface of first uniformizing lens | 6.200 | 1.600 | 1.48990 | 55.67 |
| Light emission surface of first uniformizing lens | ∞ | 9.600 | | |
| Light incident surface of second uniformizing lens | ∞ | 1.600 | 1.48990 | 55.67 |
| Light emission surface of second uniformizing lens | −6.200 | 2.080 | | |
| Light incident surface of polarization converting unit | ∞ | 2.200 | 1.523014 | 58.59 |
| Light emission surface of polarization converting unit | ∞ | 2.505 | | |
| Light incident surface of first condensing lens | 49.259 | 5.000 | 1.713000 | 53.94 |
| Light emission surface of first condensing lens | 384.661 | 42.704 | | |
| Light incident surface of second condensing lens | 29.030 | 4.710 | 1.834001 | 37.35 |
| Light emission surface of second condensing lens | 67.590 | 13.955 | | |
| Light incident surface of polarizing plate | ∞ | 0.700 | 1.516330 | 64.14 |
| Light emission surface of polarizing plate | ∞ | 2.200 | | |
| Light incident surface of display element | ∞ | — | 1.458440 | 67.82 |

The meaning of data in Table 8 is similar to that in Table 1.

In the fourth case, the cell lens 311 of the first uniformizing lens 310 and the effective area P of the display element 20 have the following configuration. A conic constant of the cell lens 311 is −2.000.

TABLE 9

| Element | Horizontal width (mm) | Vertical width (mm) |
|---|---|---|
| Cell lens | 4.400 | 3.300 |
| effective area of display element | 15.872 | 11.904 |

In Table 9, if the data of the vertical width of the cell lens 311 and the vertical width of the effective area P is selected, H1=3.300 and H2=11.904.

According to Table 8 above, $$D1=1.600+9.600+1.600=12.800$$

$$D2=2.080+2.200+2.505+5.000+42.704=54.489$$

Accordingly, W is calculated as follows:

$$W=(D2/H2)/(D1/H1)=(54.489/11.904)/(12.800/3.300)=1.18$$

In the fourth case where W=1.18, the light loss rate was measured as 25.11%.

(5) Fifth Case

The configuration data of the first uniformizing lens 310, the second uniformizing lens 320, the polarization converting unit 400, the first condensing lens 510, the second condensing lens 520, the polarizing plate 600 and the display element 20 applicable to the fifth case is as follows:

TABLE 10

| Element | r (mm) | d (mm) | n | vd |
|---|---|---|---|---|
| Light incident surface of first uniformizing lens | 6.200 | 1.600 | 1.48990 | 55.67 |
| Light emission surface of first uniformizing lens | ∞ | 9.600 | | |
| Light incident surface of second uniformizing lens | ∞ | 1.600 | 1.48990 | 55.67 |
| Light emission surface of second uniformizing lens | −6.200 | 2.080 | | |
| Light incident surface of polarization converting unit | ∞ | 2.200 | 1.523014 | 58.59 |
| Light emission surface of polarization converting unit | ∞ | 2.505 | | |
| Light incident surface of first condensing lens | 51.221 | 5.000 | 1.713000 | 53.94 |
| Light emission surface of first condensing lens | 394.635 | 44.549 | | |
| Light incident surface of second condensing lens | 30.275 | 4.710 | 1.834001 | 37.35 |
| Light emission surface of second condensing lens | 71.363 | 14.785 | | |
| Light incident surface of polarizing plate | ∞ | 0.700 | 1.516330 | 64.14 |
| Light emission surface of polarizing plate | ∞ | 2.200 | | |
| Light incident surface of display element | ∞ | — | 1.458440 | 67.82 |

The meaning of data in Table 10 is similar to that in Table 1.

In the fifth case, the cell lens 311 of the first uniformizing lens 310 and the effective area P of the display element 20 have the following configuration. A conic constant of the cell lens 311 is −2.000.

TABLE 11

| Element | Horizontal width (mm) | Vertical width (mm) |
|---|---|---|
| Cell lens | 4.400 | 3.300 |
| Effective area of display element | 15.872 | 11.904 |

In Table 11, if the data of the vertical width of the cell lens 311 and the vertical width of the effective area P is selected, H1=3.300 and H2=11.904.

According to Table 10 above, $$D1=1.600+9.600+1.600=12.800$$

$$D2=2.080+2.200+2.505+5.000+44.549=56.334$$

Accordingly, W is calculated as follows:

$$W=(D2/H2)/(D1/H1)=(56.334/11.904)/(12.800/3.300)=1.22$$

In the fifth case where W=1.22, the light loss rate was measured at 31.04%.

(6) Sixth Case

The configuration data of the first uniformizing lens 310, the second uniformizing lens 320, the polarization converting unit 400, the first condensing lens 510, the second condensing lens 520, the polarizing plate 600 and the display element 20 applicable to the sixth case is as follows:

TABLE 12

| Element | r (mm) | d (mm) | n | vd |
|---|---|---|---|---|
| Light incident surface of first uniformizing lens | 6.200 | 1.600 | 1.48990 | 55.67 |
| Light emission surface of first uniformizing lens | ∞ | 9.600 | | |
| Light incident surface of second uniformizing lens | ∞ | 1.600 | 1.48990 | 55.67 |
| Light emission surface of second uniformizing lens | −6.200 | 2.080 | | |
| Light incident surface of polarization converting unit | ∞ | 2.200 | 1.523014 | 58.59 |
| Light emission surface of polarization converting unit | ∞ | 2.505 | | |
| Light incident surface of first condensing lens | 52.763 | 5.000 | 1.713000 | 53.94 |
| Light emission surface of first condensing lens | 403.897 | 45.941 | | |
| Light incident surface of second condensing lens | 31.268 | 4.710 | 1.834001 | 37.35 |
| Light emission surface of second condensing lens | 74.561 | 15.428 | | |
| Light incident surface of polarizing plate | ∞ | 0.700 | 1.516330 | 64.14 |
| Light emission surface of polarizing plate | ∞ | 2.200 | | |
| Light incident surface of display element | ∞ | — | 1.458440 | 67.82 |

The meaning of data in Table 12 is similar to that in Table 1.

In the sixth case, the cell lens 311 of the first uniformizing lens 310 and the effective area P of the display element 20 have the following configuration. A conic constant of the cell lens 311 is −2.000.

TABLE 13

| Element | Horizontal width (mm) | Vertical width (mm) |
|---|---|---|
| Cell lens | 4.400 | 3.300 |
| Effective area of display element | 15.872 | 11.904 |

In Table 13, if the data of the vertical width of the cell lens 311 and the vertical width of the effective area P is selected, H1=3.300 and H2=11.904.

According to Table 12 above, $$D1=1.600+9.600+1.600=12.800$$

$$D2=2.080+2.200+2.505+5.000+45.941=57.726$$

Accordingly, W is calculated as follows:

$$W=(D2/H2)/(D1/H1)=(57.726/11.904)/(12.800/3.300)=1.25$$

In the sixth case where W=1.25, the light loss rate was measured as 35.18%.

(7) Seventh Case

The configuration data of the first uniformizing lens 310, the second uniformizing lens 320, the polarization converting unit 400, the first condensing lens 510, the second condensing lens 520, the polarizing plate 600 and the display element 20 applicable to the seventh case is as follows:

TABLE 14

| Element | r (mm) | d (mm) | n | vd |
|---|---|---|---|---|
| Light incident surface of first uniformizing lens | 6.200 | 1.600 | 1.48990 | 55.67 |
| Light emission surface of first uniformizing lens | ∞ | 9.600 | | |
| Light incident surface of second uniformizing lens | ∞ | 1.600 | 1.48990 | 55.67 |
| Light emission surface of second uniformizing lens | −6.200 | 2.080 | | |
| Light incident surface of polarization converting unit | ∞ | 2.200 | 1.523014 | 58.59 |
| Light emission surface of polarization converting unit | ∞ | 2.505 | | |
| Light incident surface of first condensing lens | 55.317 | 5.000 | 1.713000 | 53.94 |
| Light emission surface of first condensing lens | 418.746 | 48.251 | | |
| Light incident surface of second condensing lens | 32.908 | 4.710 | 1.834001 | 37.35 |
| Light emission surface of second condensing lens | 79.834 | 16.498 | | |
| Light incident surface of polarizing plate | ∞ | 0.700 | 1.516330 | 64.14 |
| Light emission surface of polarizing plate | ∞ | 2.200 | | |
| Light incident surface of display element | ∞ | – | 1.458440 | 67.82 |

The meaning of data in Table 14 is similar to that in Table 1.

In the seventh case, the cell lens 311 of the first uniformizing lens 310 and the effective area P of the display element 20 have the following configuration. A conic constant of the cell lens 311 is −2.000.

TABLE 15

| Element | Horizontal width (mm) | Vertical width (mm) |
|---|---|---|
| Cell lens | 4.400 | 3.300 |
| Effective area of display element | 15.872 | 11.904 |

In Table 15 above, if the data of the vertical width of the cell lens 311 and the vertical width of the effective area P are selected, H1=3.300 and H2=11.904.

According to Table 14, $$D1=1.600+9.600+1.600=12.800$$

$$D2=2.080+2.200+2.505+5.000+48.251=60.036$$

Accordingly, W is calculated as follows:

$$W=(D2/H2)/(D1/H1)=(60.036/11.904)/(12.800/3.300)=1.30$$

In the seventh case where W=1.30, the light loss rate was measured as 41.31%.

As shown in the test cases above, W=(D2/H2)/(D1/H1)>1/0 to normally display an image in the display element 20. However, if W exceeds 1.0, the light loss rate increases.

Accordingly, W should meet 1.0<W≤k, but the constant k may be provided in consideration of the light loss rate. The constant k may vary depending on the optical property of elements of the illuminating unit 10 when the display apparatus 1 is manufactured.

For example, in consideration of the test cases above, the constant k may be set as 1.4 to make the light loss rate 50% or less, or set as 1.2 or 1.3 if the display apparatus 1 is designed to decrease the light loss rate further.

As described above, according to an exemplary embodiment, the illuminating unit 10 is arranged to reflect 1.0<(D2/H2)/(D1/H1)≤k, corresponding to the width of the image of the display element 20 and the width of the cell lens 311 of the first uniformizing lens 310. With the simple configuration, the image may be normally displayed and the light efficiency may improve.

Figure 7:
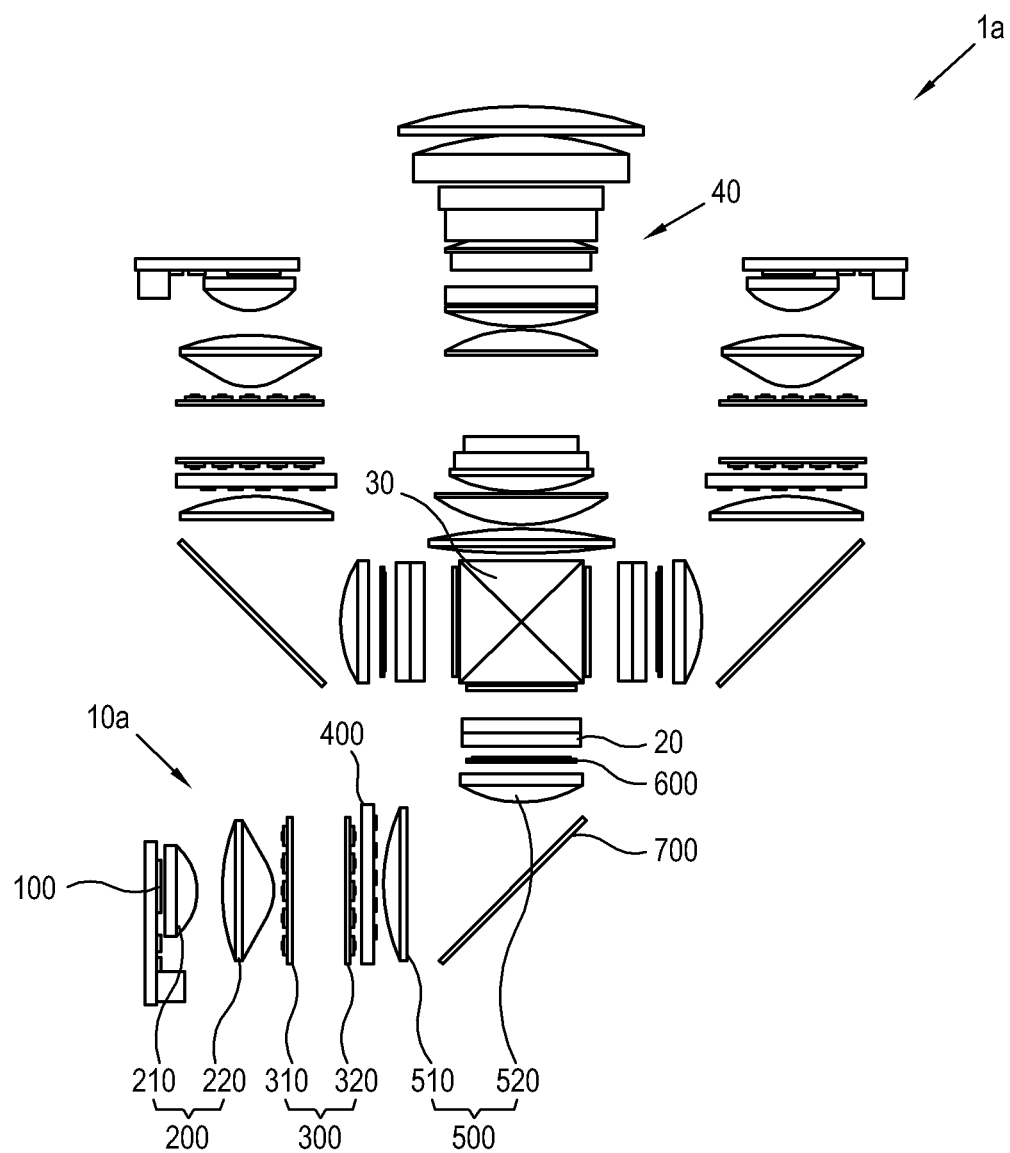
FIG. 7 illustrates a configuration of a display apparatus according to another exemplary embodiment.

In the foregoing exemplary embodiments, the optical path from the light source 100 to the display element 20 is straight, but the exemplary embodiments are not limited thereto. FIG. 7 illustrates a display apparatus 1a according to another exemplary embodiment. As shown therein, the optical path from the light source 100 to the display element 20 may be bent.

An illuminating unit 10a of the display apparatus 1a according to an exemplary embodiment includes a light source 100, a collimating light unit 200, a uniformizing unit 300, a polarization converting unit 400, a condensing unit 500 and a polarizing plate 600. The elements of the display apparatus 1a according to the exemplary embodiment have substantially the same functions as those according to the previous exemplary embodiment.

As the optical path from the first condensing lens 510 to the second condensing lens 520 is bent, the illuminating unit 10a includes a reflection mirror 700 installed between the first and second condensing lenses 510 and 520 to transmit light from the first condensing lens 510 to the second condensing lens 520. Even if the optical path is bent by the reflection mirror 700, the reflection mirror 700 only changes the optical path but does not change the property of the light. Thus, the spirit of the inventive concept may also apply.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. An illuminating unit comprising:
   a light source which emits light;
   a uniformizing unit which uniformizes the light emitted from the light source, wherein the uniformizing unit comprises a plurality of uniformizing lenses arranged on an optical path;
   a condensing unit which condenses light emitted from the uniformizing unit to emit to a display element of a display apparatus, wherein the condensing unit comprises a plurality of condensing lenses sequentially arranged on the optical path, and
   wherein the uniformizing unit and the condensing unit are arranged to meet the following formula:

$$1.0<(D2/H2)/(D1/H1)\leq1.4$$

wherein H1 is a width of a cell lens of the uniformizing lenses, H2 is a width of an image displayed in the display element, D1 is a distance between a light incident surface initially arranged on the optical path and a light emission surface lastly arranged on the optical path among the plurality of uniformizing lenses, and D2 is a distance between the light emission surface lastly arranged on the optical path among the plurality of uniformizing lenses and a light incident surface lastly arranged on the optical path among the plurality of condensing lenses.

2. The illuminating unit according to claim 1, wherein H1 is a horizontal width or a vertical width of the cell lens, and H2 is a horizontal width of the image if H1 is designated as a horizontal width of the cell lens, and H2 is a vertical width of the image if H1 is designated as a vertical width of the cell lens.

3. The illuminating unit according to claim 1, wherein the uniformizing lens comprises a fly eye lens in which the cell lenses are arrayed according to a same standard.

4. The illuminating unit according to claim 1, further comprising a collimating light unit which adjusts diffused light from the light source to collimating light and emits the collimating light to the uniformizing unit, wherein the collimating light unit comprises a plurality of collimating light lenses sequentially arranged on the optical path.

5. The illuminating unit according to claim 4, wherein the plurality of collimating light lenses comprises a first collimating light lens provided in the light source and a second collimating light lens provided in the uniformizing unit, and the plurality of collimating light lenses meets the following formula:

$$0.5\leq p1/p2\leq1.2$$

wherein p1 is a power of the first collimating light lens and p2 is a power of the second collimating light lens.

6. The illuminating unit according to claim 4, wherein the plurality of condensing lenses comprise a first condensing lens provided in the collimating light unit and a second condensing lens provided in the display element, and the plurality of condensing lenses meet the following formula:

$$0.9\leq p3/p4\leq1.1$$

wherein p3 is a power of the first condensing lens and p4 is a power of the second condensing lens.

7. The illuminating unit according to claim 6, further comprising a reflection minor which is installed on the optical path between the first condensing lens and the second condensing lens.

8. The illuminating unit according to claim 1, further comprising a polarization converting unit which converts light emitted from the uniformizing unit to a preset polarizing property and emits the converted light to the condensing unit.

9. The illuminating unit according to claim 1, wherein the light source comprises a light emitting diode.

10. A display apparatus comprising:
an illuminating unit which generates and emits light;
a display element which displays an image by the light emitted by the illuminating unit; and
a projection optical unit which projects an image displayed on the display element to a screen,
wherein the illuminating unit comprises:
a light source which emits light;
a uniformizing unit which uniformizes the light emitted from the light source, wherein the uniformizing unit comprises a plurality of uniformizing lenses sequentially arranged on an optical path; and
a condensing unit which condenses light emitted from the uniformizing unit to emit the condensed light to the display element, wherein the condensing unit comprises a plurality of condensing lenses sequentially arranged on the optical path, and
the uniformizing unit and the condensing unit are arranged to meet the following formula:

$$1.0 < (D2/H2)/(D1/H1) \leq 1.4$$

wherein H1 is a width of a cell lens of the uniformizing lenses, H2 is a width of an image displayed in the display element, D1 is a distance between a light incident surface initially arranged on an optical path among the plurality of uniformizing lenses and a light emission surface lastly arranged among the plurality of uniformizing lenses, and D2 is a distance between the light emission surface lastly arranged among the plurality of uniformizing lenses and a light incident surface lastly arranged on the optical path among the plurality of condensing lenses.

11. An illuminating unit to a display element of a display apparatus, the illuminating unit comprising:
a light source which emits light;
a collimating light unit which adjusts diffused light emitted from the light source to collimating light, wherein the collimating unit comprises a first collimating light lens and a second collimating light lens sequentially arranged along an optical path;
a uniformizing unit which uniformizes light emitted from the second collimating light lens, wherein the uniformizing unit comprises a first uniformizing lens and a second uniformizing lens sequentially arranged along the optical path;
a polarization converting unit which converts light emitted from the second uniformizing lens to a preset polarizing property; and
a condensing unit which condenses light emitted from the polarization converting unit to emit the light to the display element, wherein the condensing unit comprises a first condensing lens and a second condensing lens sequentially arranged along the optical path,
wherein a distance between the first uniformizing lens, the second uniformizing lens, and the second condensing lens are designated based on a width of one of a plurality of cell lenses forming the first uniformizing lens and a width of an image displayed in the display element, and
wherein the first uniformizing lens, the second uniformizing lens, and the second condensing lens are arranged to meet the following formula:

$$1.0 < (D2/H2)/(D1/H1) \leq 1.4$$

where H1 is a width of the cell lens, H2 is a width of an image displayed in the display Element, D1 is a distance between a light incident surface of the first uniformizing lens and a light emission surface of the second uniformizing lens, and D2 is a distance between the light emission surface of the second uniformizing lens and a light incident surface of the second condensing lens.

12. The illuminating unit according to claim 11, wherein H1 is a horizontal width or a vertical width of the cell lens, and H2 is a horizontal width of the image if H1 is a horizontal width of the cell lens, and H2 is a vertical width of the image if H1 is a vertical width of the cell lens.

13. The illuminating unit according to claim 11, wherein the first uniformizing lens and the second uniformizing lens comprise a fly eye lens in which the cell lenses are arrayed according to a same standard.

14. The illuminating unit according to claim 13, wherein the first uniformizing lens and the second uniformizing lens comprise cell lenses whose convex surfaces are arranged back to back.

15. The illuminating unit according to claim 11, further comprising a reflection minor which is provided on the optical path between the first condensing lens and the second condensing lens.

16. The illuminating unit according to claim 11, wherein the light source comprises a light emitting diode.

17. A display apparatus comprising:
an illuminating unit which generates and emits light;
a display element which forms an image by the light emitted by the illuminating unit; and
a projection optical unit which projects an image formed in the display element to a screen,
wherein the illuminating unit comprises:
a light source which emits light;
a collimating light unit which adjusts diffused light emitted from the light source to collimating light, wherein the collimating unit comprises a first collimating light lens and a second collimating light lens sequentially arranged along an optical path;
a uniformizing unit which uniformizes light emitted from the second collimating light lens, wherein the uniformizing unit comprises a first uniformizing lens and a second uniformizing lens sequentially arranged along the optical path;
a polarization converting unit which converts light emitted from the second uniformizing lens to a preset polarizing property; and
a condensing unit which condenses light emitted from the polarization converting unit to emit the light to the display element, wherein the condensing unit comprises a first condensing lens and a second condensing lens sequentially arranged along the optical path,
wherein a distance between the first uniformizing lens, the second uniformizing lens, and the second condensing lens is designated based on a width of one of the plurality of cell lenses forming the first uniformizing lens and a width of an image displayed in the display element, and wherein the first uniformizing lens, the second uniformizing lens, and the second condensing lens are arranged to meet the following formula:

$$1.0 < (D2/H2)(D1/H1) \leq 1.4$$

where H1 is a width of the cell lens, H2 is a width of an image displayed in the display element, D1 is a distance between a light incident surface of the first uniformizing lens and a light emission surface of the second uniformizing lens, and D2 is a distance between the light emission surface of the second uniformizing lens and a light incident surface of the second condensing lens.

18. The display apparatus according to claim 17, wherein the illuminating unit and the display element are installed corresponding to a plurality of colors, and the display apparatus further comprises an image synthesizing unit which synthesizes an image displayed in the display element corresponding to each of the plurality of colors and transmits the image to the projection optical unit.

* * * * *